United States Patent [19]
Gueziec et al.

[11] Patent Number: 6,026,142
[45] Date of Patent: Feb. 15, 2000

[54] SYSTEM AND METHOD FOR BOUNDARY DETECTION IN TOMOGRAPHIC IMAGES BY GEOMETRY-CONSTRAINED EDGE DETECTION OF PROJECTED DATA

[75] Inventors: Andre P. Gueziec, Mamaroneck; Alan David Kalvin, Irvington, both of N.Y.

[73] Assignee: International Business Machines Corporation, Armonk, N.Y.

[21] Appl. No.: 09/054,022

[22] Filed: Apr. 2, 1998

[51] Int. Cl.[7] .................................................. A61B 6/03
[52] U.S. Cl. .................... 378/8; 378/4; 378/901
[58] Field of Search .................... 378/4, 8, 901

[56] References Cited

U.S. PATENT DOCUMENTS 4,888,693   12/1989   Tam ............................................. 378/4

*Primary Examiner*—David Vernon Bruce
*Attorney, Agent, or Firm*—Whitham, Curtis & Whitham; Louis J. Percello

[57] ABSTRACT

A system and method extracts object boundaries in computed tomography images that have been corrupted by noise. The system and method find object boundaries in tomography images by finding edges in sinogram data, thereby providing a segmentation method that is insensitive to the image noise introduced by the process of image reconstruction from projections. The boundary-detection system uses projection data, and optionally tomographic image data, to detect the boundaries of objects in tomographic images. The system is of particular value for boundary-detection in images corrupted by reconstruction artifacts, such as CT scans of hospital patients who have implanted metal prostheses. The system is applicable to recovering the boundaries of convex objects, and the convex segments of the boundaries of concave objects (though not the complete boundaries of the concave objects themselves). The system is clinically viable in the sense that this method can be embodied in a practical, real-world system that can be used routinely in hospitals and medical clinics, and relies only on data that are available from standard medical CT scanners, that is the CT images and scout images (and not the original sinogram data).

13 Claims, 15 Drawing Sheets

SYSTEM AND METHOD FOR BOUNDARY DETECTION IN TOMOGRAPHIC IMAGES BY GEOMETRY-CONSTRAINED EDGE DETECTION OF PROJECTED DATA

BACKGROUND OF THE INVENTION

1. Field of the Invention

The present invention generally relates to the field of computer image processing of computer tomography (CT) images and, more particularly, to the problem of detecting the boundaries of objects appearing in such images.

2. Background Description

U.S. Pat. No. 5,416,815, which is incorporated here by reference in its entirety, describes computer tomography (CT) systems and the method of image reconstruction from projections.

Objects of interest in an X-ray computed tomography (CT) image are typically identified by applying image processing algorithms directly to the CT image. Such algorithms, known as a segmentation algorithms, detect objects of interest by identifying the boundaries of these objects (or equivalently by identifying the pixels belonging to each object).

An alternative method of detecting objects in a CT image is to directly process the two-dimensional (2D) projection data from which the two-dimensional CT image is subsequently reconstructed.

In this alternative approach, sharp discontinuities (edges) in the two-dimensional projection data (which can be considered as a 2D image) are first detected, and then object boundaries in the CT image are identified by making use of the following facts:

- each ray generated by the CT scanner produces a single point in the projection image,
- each ray generated by the CT scanner that is tangent to a convex object being scanned will appear as an edge in the projection image, and
- each point in the projection image corresponds to a line segment in the CT image that is reconstructed from the projection image.

This approach, while potentially usef[]uil, suffers from the fact that in practice projection data are usually noisy. Therefore, there are invariably localization errors in the edge-detection. Even small errors in projection data can lead to large boundary-detection errors in the CT image.

To solve this noisy-data problem, we provide a system and method for resolving the inconsistencies induced by edge-detection errors. This method applies constraints that are imposed by the geometry of the CT scanner and the scanning process. This method is applicable for the detection of the boundaries of convex objects, and the convex sections of the boundaries of concave objects, in CT images.

The prior art in boundary recovery from projection data includes: M. Bergstrom et al., "Determination of Object Contour from Projections for Attenuation Correction in Cranial Positron Emission Tomography", *Journal of Computer Assisted Tomography*, April 1992, 6(2), pp. 365–372; Jean-Philippe Thirion, "A Geometric Alternative to Computed Tomography", *INRIA Research Report No.* 1463 (June 1991), INRIA, 78153 Le Chesnay Cedex, France; Jean-Philippe Thirion and Nicholas Ayache, "Method and device for examining a body, particularly for tomography", U.S. Pat. No. 5,421,330, (1995); N. Srinivasa, K. R. Ramakrishnan, and K. Rajgopal, "Detection of edges from projections", *IEEE Trans. Medical Imaging*, March 1992, 11(1), pp.76–80; Ralph Benjamin, "Method and apparatus for generating images", U.S. Pat. No. 5,647,018 (1997).

Thirion recognized the problem of the inconsistencies that are introduced during edge-detection of the projection data. The proposed solution works by removing inconsistencies in the order that they are detected. As Thirion notes (page 18 of INRIA research report 1463 cited above), while this method has the advantage of being fast, it has the disadvantage that it can produce inaccurate results.

DEFINITIONS

The basic concepts described in the present invention are better understood with review of the following definitions.

Pixel: A picture element. The basic element in a two-dimensional digital (2D) picture.

Image: A rectangular 2D digital picture. Each pixel in the image is identified by a pair of integers (x,y), where x and y are the column and row locations of the pixel respectively. (We shall use the terms "slice" and "image" interchangeably in describing the present invention).

Image segmentation: The process of identifying objects of interest in an image.

Edge: An edge is a point in an image at the transition between two regions having markedly disparate pixel values.

Segmented object: A object of interest in an image identified by the process of segmentation.

Ray: This refers to a single x-ray beam that travels from the CT scanner x-ray tube to a detector cell on the CT scanner detector array.

View: A view consists of a set of rays produced by a CT scanner with the x-ray tube in a fixed position.

Sinogram: In its standard mode of operation, a CT scanner collects a set S of views while the CT table is held in a fixed position. The views in the set S are acquired at different positions of the x-ray tube as it rotates around the table. A sinogram consist of all the projection data (or a processed version thereof) in a single set S of views.

Since each data point in a sinogram corresponds to a single ray traveling from the x-ray source to the detector, we can represent a sinogram as a 2D image, where each pixel is uniquely identified by the ordered pair of integers (r,v) where v is the view containing this ray, and r is the number of the ray within view v. We will therefore use the following terms interchangeably: sinogram data; projection data; sinogram image; projection image.

Scout image: A scout image is a 2D digital X-ray produced when a CT machine scans a collection of objects while the X-ray tube is held in a fixed position, and the CT table, together with the objects, is moved.

SUMMARY OF THE INVENTION

The following is a brief description of the method according to the present invention. Given a set of projection data of a scene containing a convex object, we first find the edges (in projection image) that correspond to lines tangent to the object boundary (in the CT image). We then compute the locations of these corresponding tangent line segments in the CT image, using the scanner geometry data.

In the ideal (noise-free) case, these tangents lines will intersect in a well-defined pattern, and this pattern of intersections uniquely defines the object boundary (or more precisely, the polygonal approximation to the boundary). We call such a pattern of tangent intersections a consistent pattern, and we call the set of tangents an consistent tangent set.

Because of noise, the ideal case does not usually occur, and the pattern of tangent intersections will contain ambiguous information, and will not define the correct object boundary. We call such a pattern of tangent intersections an inconsistent pattern, and we call the set of tangents an inconsistent tangent set.

In this invention, we describe a method for resolving a set of inconsistent tangents, to produce a set of consistent tangents, from which the object boundary is then derived.

It is therefore an object of the present invention to provide a system and method to extract object boundaries in computed tomography images that have been corrupted by noise, and in particular in X-ray computer tomography (CT) images that have been corrupted by reconstruction artifacts.

It is further an object of the present invention to provide a system and method for finding object boundaries in tomography images by finding edges in sinogram data, thereby providing a segmentation method that is insensitive to the image noise introduced by the process of image reconstruction from projections.

According to the invention, there is provided a boundary-detection system that:

uses projection data, and optionally tomographic image data, to detect the boundaries of objects in tomographic images;

is of particular value for boundary-detection in images corrupted by reconstruction artifacts, such as CT scans of hospital patients who have implanted metal prostheses;

is applicable to recovering the boundaries of convex objects, and the convex segments of the boundaries of concave objects (though not the complete boundaries of the concave objects themselves); and is clinically viable in the sense that this method can be embodied in a practical, real-world system that can be used routinely in hospitals and medical clinics, and relies only on data that are available from standard medical CT scanners, that is the CT images and scout images (and not the original sinogram data).

This invention has particular application to the problem of detecting boundaries in CT scans of medical patients having implanted metallic prostheses.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
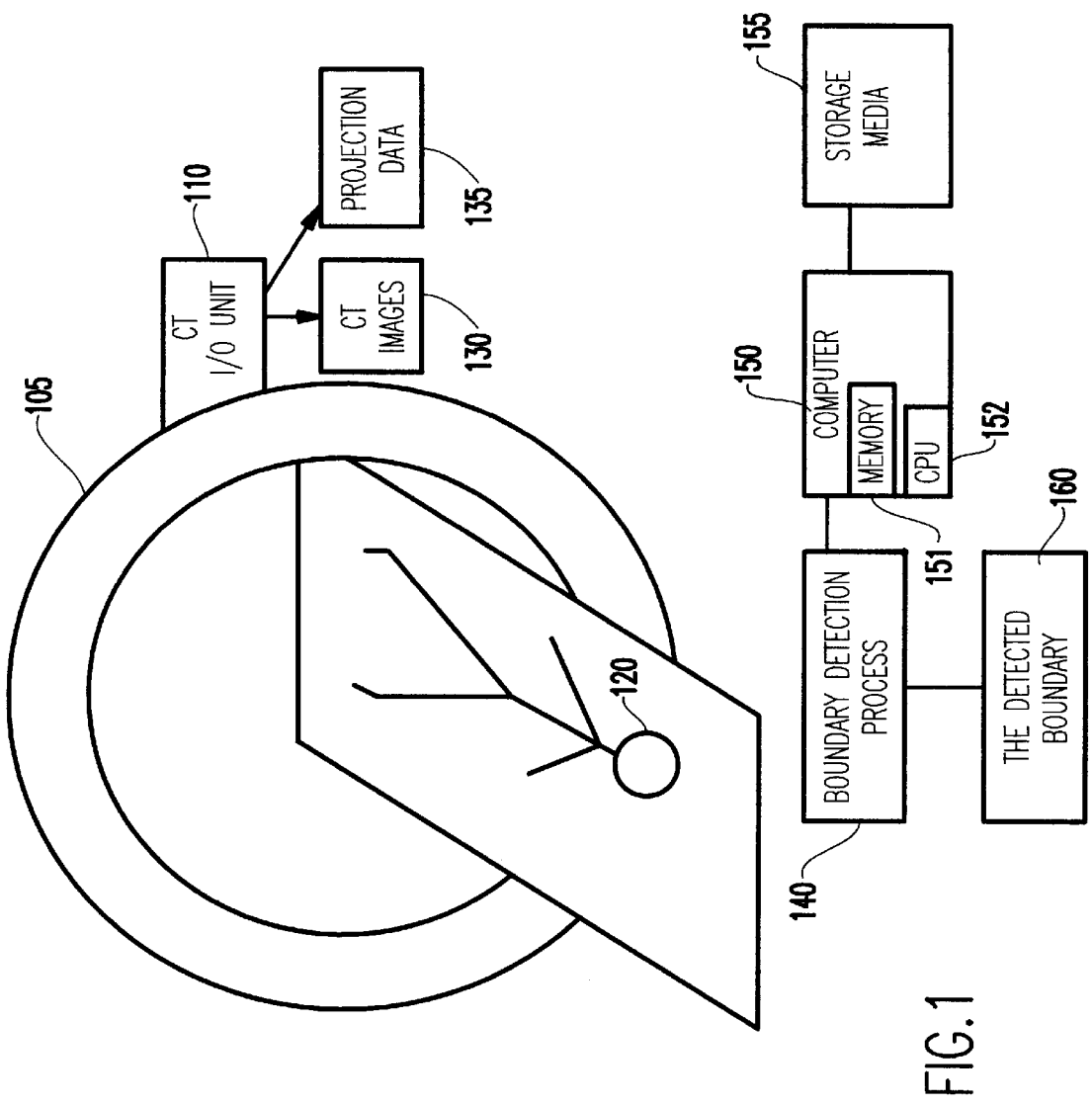
FIG. 1 is a block diagram of a computer tomography (CT) system using the present invention.

Referring now to the drawings, and more particularly to FIG. 1, there is shown one preferred embodiment of the present invention for detecting boundaries in computer tomography (CT) images 130 produced by a computed tomography scanner 105. A patient 120 is scanned by the CT scanner 105, collecting projection data 135 from the CT input/output (I/O) unit 110, from which is created a set of two-dimensional CT images 130. This process of creating the images 130 is known as image reconstruction from projections. The CT images 130 contain cross-sectional details of the scene that was scanned, which typically includes the patient 120.

The CT images 130 and the related CT projection data 135 are input to a computer 150 and, optionally, stored on an external storage medium 155. The computer 150 may be, for example, an IBM RS/6000 workstation running AIX, IBM's version of the UMX operating system, and the external storage medium 155 may be, for example, a disk storage system connected to the computer. The computer 150 includes a central processing unit (CPU) 152 and memory 151. A boundary-detection program 140 stored in memory 151 running on CPU 152 of the computer 150 reads in the CT images 130 and projection data 135, and computes the boundary 160.

Figure 2:
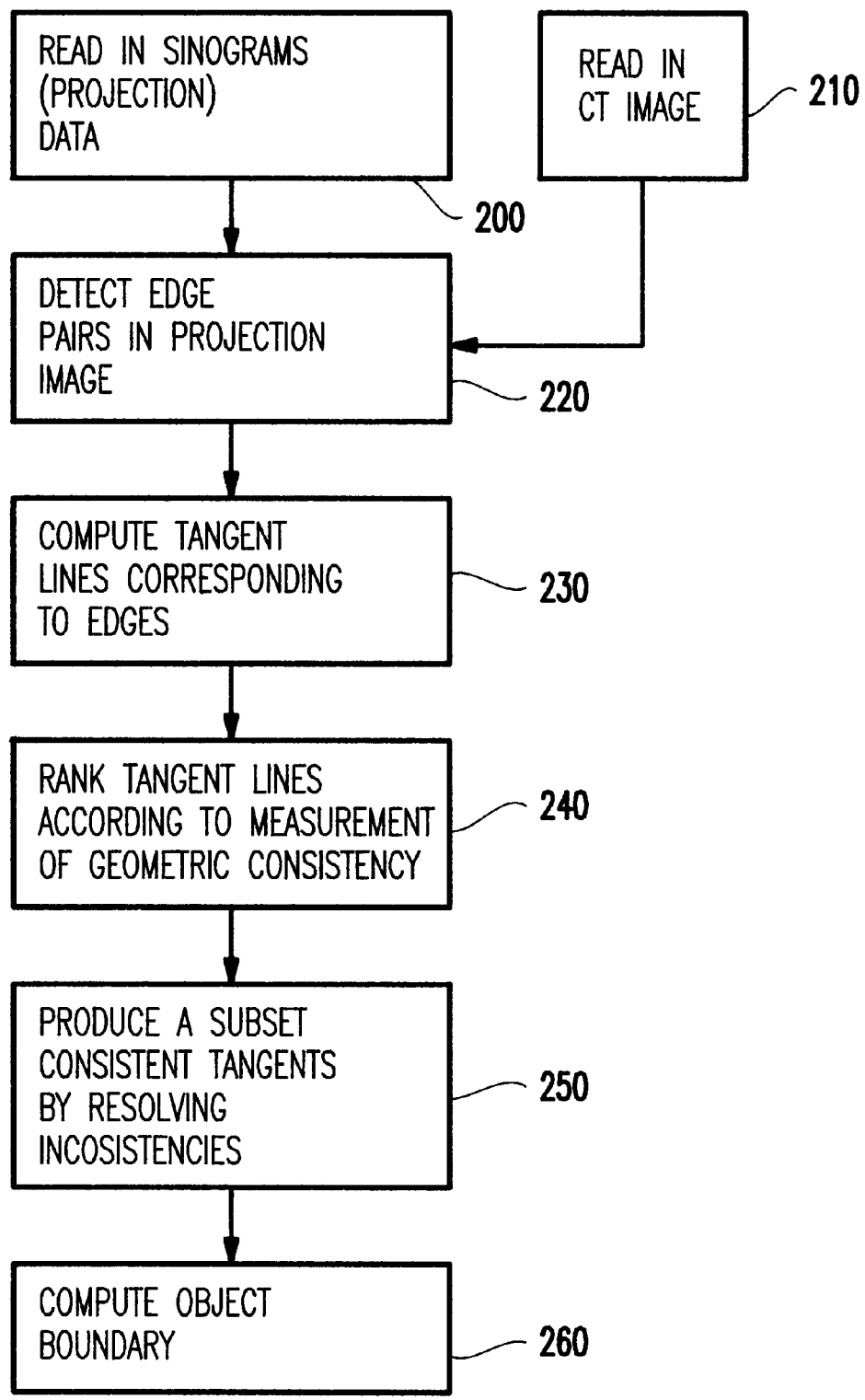
FIG. 2 is a flow chart showing the overall logic of the computer implemented process according to the invention.

FIG. 2 shows a flow chart of the boundary-detection program 140 shown in FIG. 1. The CT image is processed as follows. The sinogram (i.e., projection) data is read into the computer in function block 200, as is the CT image in function block 210. In function block 220 the high-contrast sinogram edges are detected.

Since we are dealing with convex boundaries (or convex boundary segments), each of these high-contrast sinogram edges corresponds to a line in the CT image that is tangent to an object boundary. These boundary tangent lines are then computed in function block 230. In function block 240 these tangent lines are each assigned a value of merit that quantifies how consistent the tangent line is with the other tangent lines. (We shall describe this notion of consistency in more detail in the following sections of this document.) The tangent lines are ranked according to the value of merit, which is then used in function block 250 to produce, from the set of all tangent lines, a subset of consistent tangents. Finally, in function block 260, the desired object boundary is computed from the subset of consistent tangents.

Figure 3:
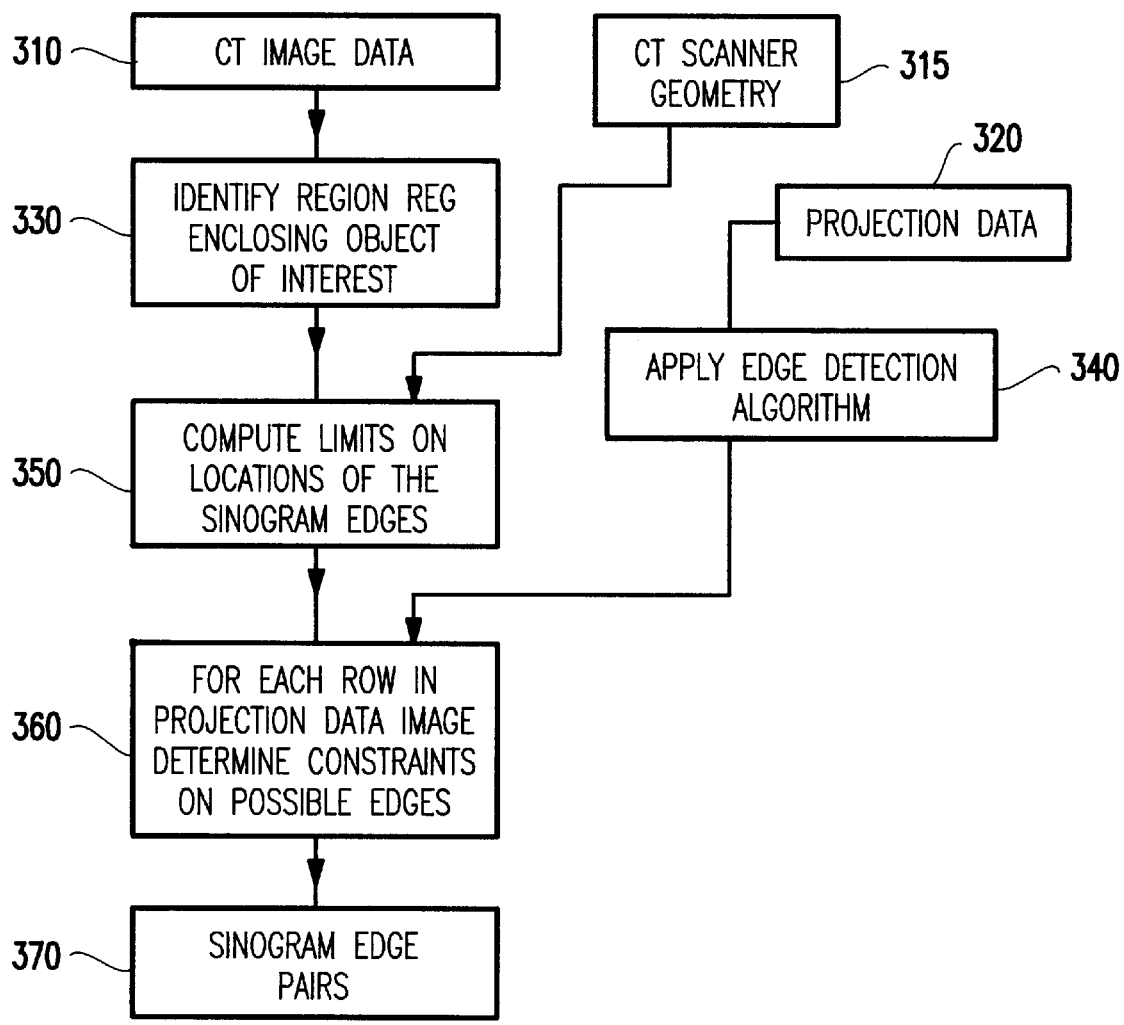
FIG. 3 is a flow chart showing the steps of extracting edge pairs from a sinogram image.

FIG. 3 is a flowchart illustrating the method of detecting sinogram edges (function block 220 of FIG. 2). The projection data (which form a 2D image) are read in function block 320, and an edge-detector algorithm is applied to this projection image in function block 340, using prior art image processing techniques (see, for example, *Computer Vision* by Ballard and Brown, Prentice Hall, 1982). A region REG is identified in process block 330 that completely encloses the object of interest in the CT image input in function block 310. In the preferred embodiment of this invention, one way that this region can be identified is manually by a human operator by tracing the outline of region REG on top of the CT image on the computer monitor. Now region REG induces a set of constraints on the possible edge locations in the sinogram image that correspond to points of the object boundary. These edge constraints can be easily derived, using prior art methods, from REG and the CT scanning geometry input at function block 315. (In general, such a region REG can always be identified in the type of CT image that we consider in the preferred embodiment of this invention, even if the precise location of the object boundary is corrupted by noise. In the event that the CT image is so corrupted by noise as to make it impossible to find such a region REG, the method described in FIG. 3 can still applied, with steps 330 and 350 being skipped. The method will still work correctly when these two steps are skipped, although the process will be slower, since the function of steps 330 and 350 is to speed up computation).

In function block 360, further constraints on the possible sinogram edges are computed, by making use of the facts that:

(a) the scanned object is convex; and (b) projection rays passing through the object are attenuated more (and therefore produce sinogram pixels with higher values) than rays passing through the background region immediately outside the object.

From (a) we can conclude that in each row of the sinogram, there are exactly two edges corresponding to the object boundary, and from (b) that the image intensity gradient at the leftmost of these two edges is positive, and the image intensity gradient at the rightmost of these two edges is negative.

The constraints in function blocks 350 and 360 are used to select, from edge data computed in function block 340, the required edges pairs in function block 370. If these constraints are not adequate on their own to uniquely identify the required edges pairs, a further selection step is required to do this. In the preferred embodiment of this invention, this additional step is performed manually by a human operator.

Figure 4:
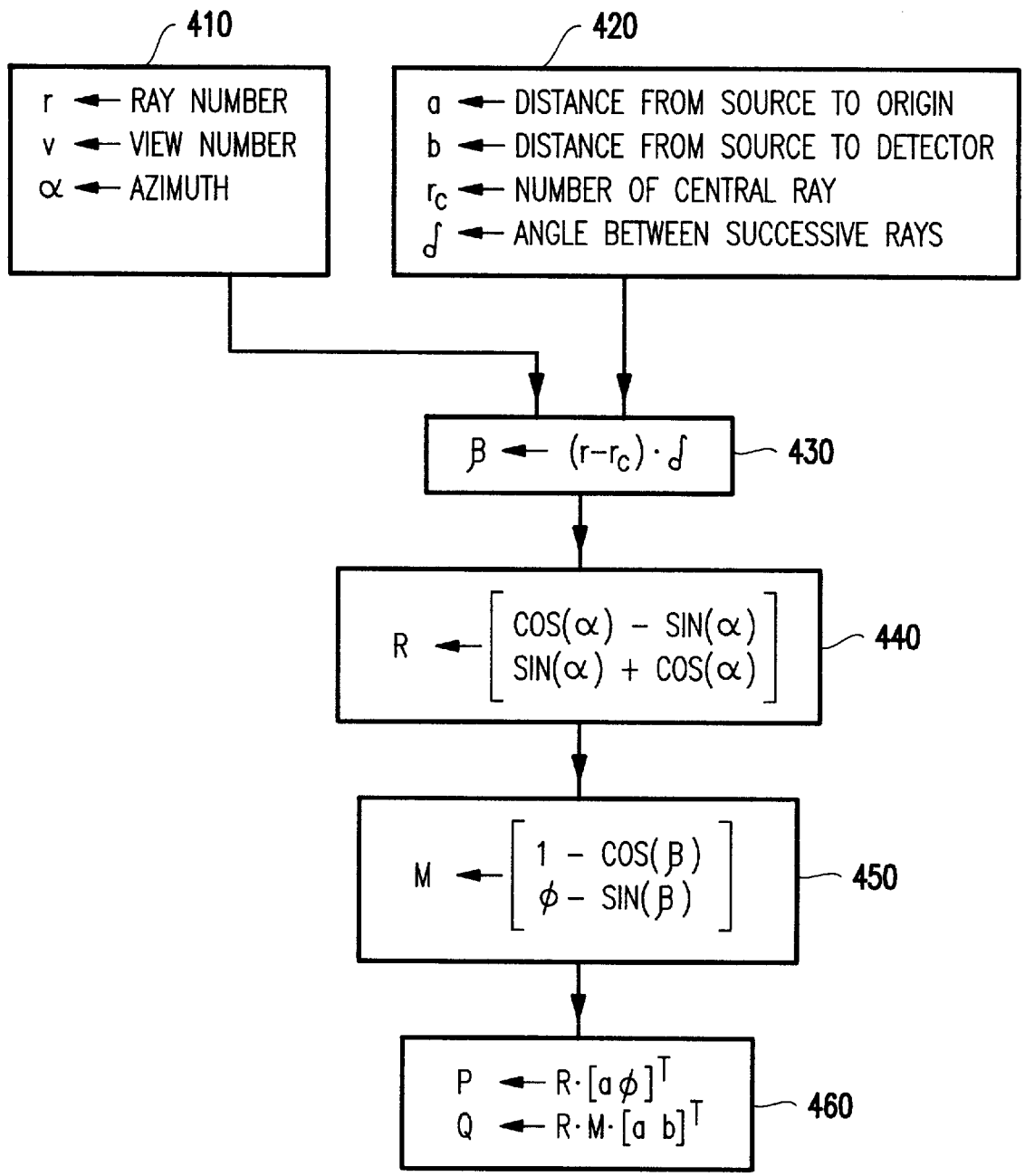
FIG. 4 is a flow chart showing the steps of computing an image tangent line from a sinogram edge.
Figure 5:
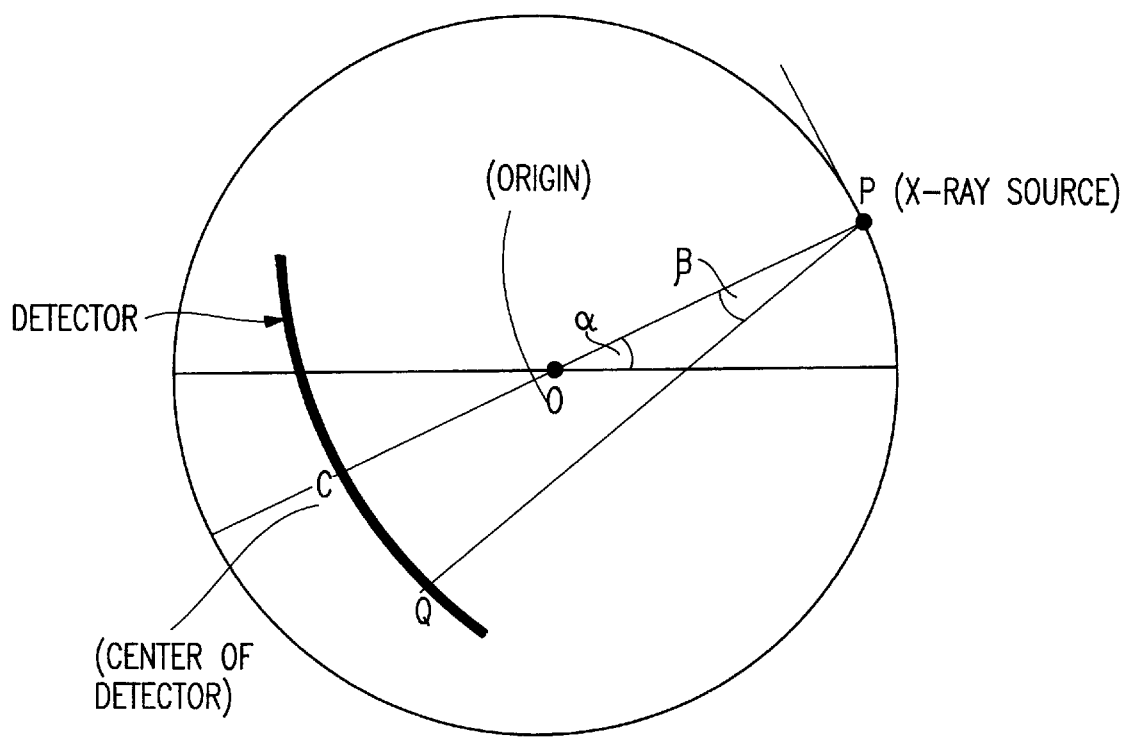
FIG. 5 illustrates the geometry for computing an image tangent line from a sinogram edge.

FIGS. 4 and 5 are referred to for the description of the details of the process of computing tangent lines from sinogra[]rn edges (i.e., function block 230 in FIG. 2). FIG. 4 is a flowchart showing the method used to derive the line segment corresponding to a given sinogram pixel. The accompanying drawing in FIG. 5 shows the scanning geometry related to computing this line segment.

In FIG. 4, block 410 shows the sinogram edge input data:

(r,v) are the (ray,view) coordinates of the edge; and a is the azimuth angle of the X-ray source at view v.

Block 420 shows the CT scanner geometry input data:

a is to distance from X-ray source to the origin (i.e., the length of line PO in FIG. 5);

b is to distance from X-ray source to the detector (i.e., the length of line PC in FIG. 5);

$r_c$ is the ray number of the central ray (i.e., the ray along line PC in FIG. 5); and δ is the angle between successive rays in the view.

In function block 430, β, the angle between lines PC and PQ in FIG. 5, is computed. In function block 440 the 2×2 rotation matrix R is initialized. In function block 450, the 2×2 matrix M is initialized. In function block 460 the coordinates of the endpoints of line segment PQ are computed.

The sequence of process block steps 410, 420, 430, 440, 450, and 460 (FIG. 4) is applied to every sinogram edge. This completes the computation of all boundary tangents (process block 420 of FIG. 4).

To describe the next step of computing the object boundary from the set of tangent lines computed, we divide these tangents that have been computed into two sets, left tangents and right tangents, as illustrated in FIGS. 6A to 6D.

Figure 6A:
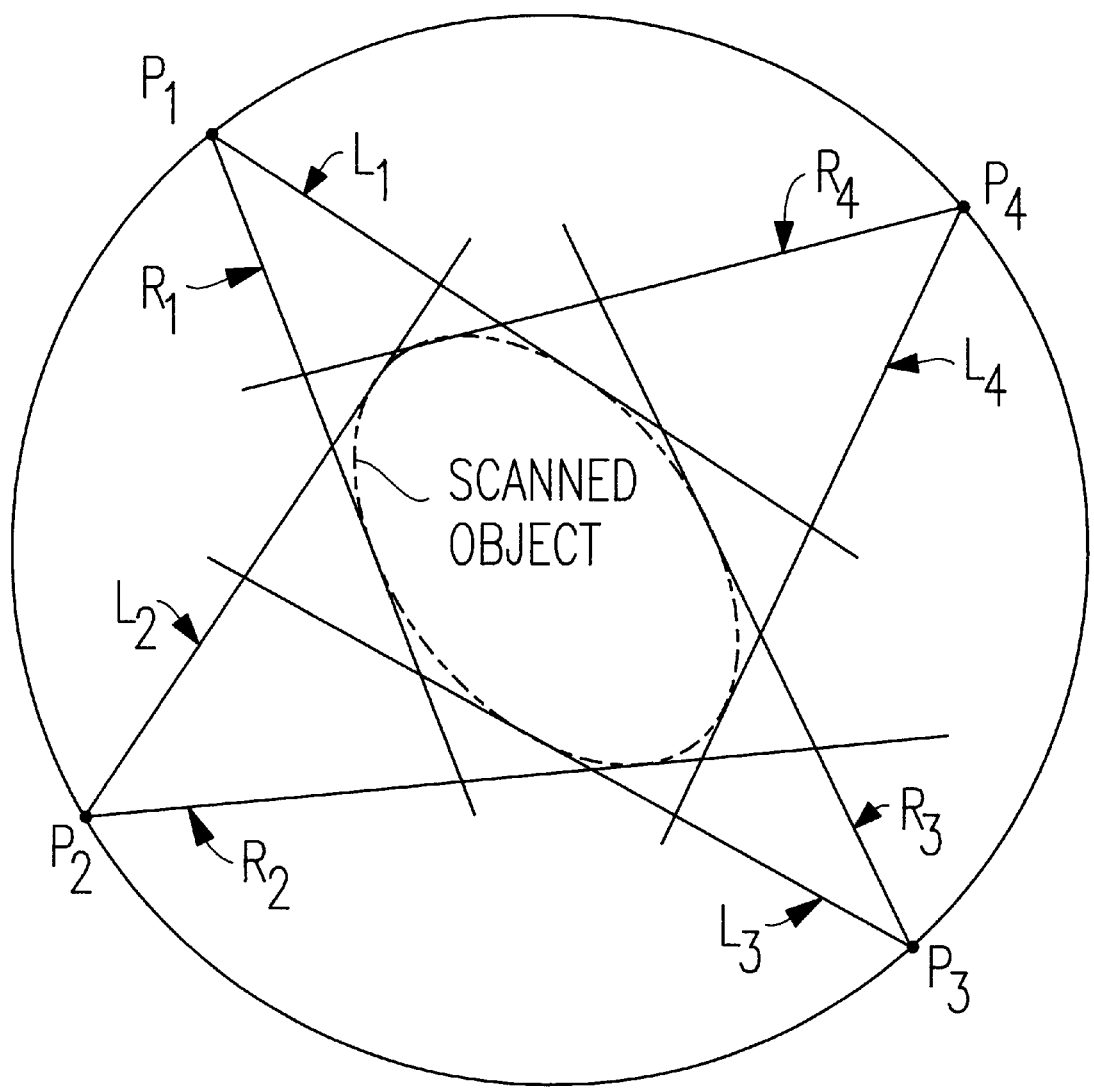
FIGS. 6A to 6D geometrically illustrate the concept of left and right tangents, and left and right polygons.
Figure 6B:
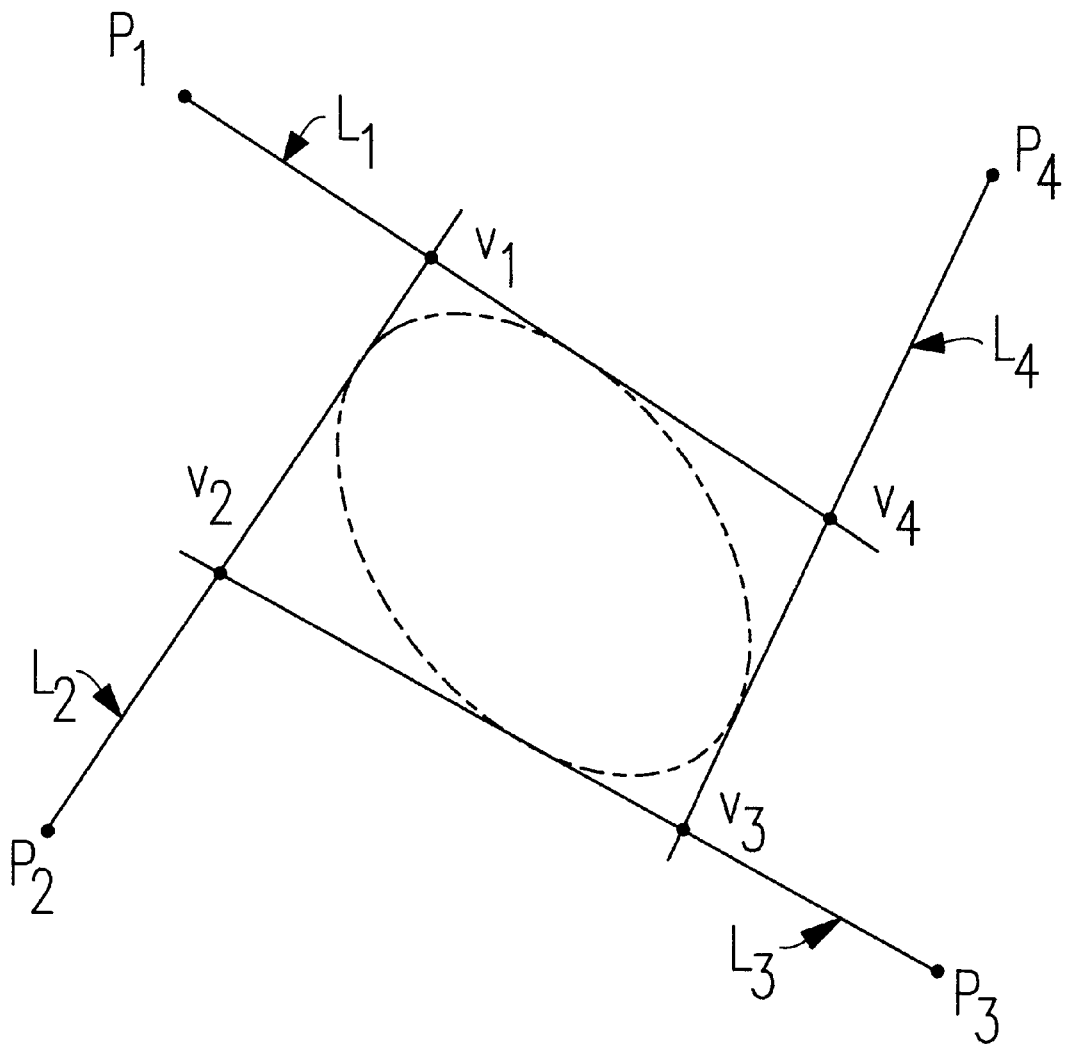

In FIG. 6A, $(L_1,R_1), (L_2,R_2), (L_3,R_3)$, and $(L_4,R_4)$ are four pairs of tangent lines obtained from scanning a convex object with scan views acquired at points $P_1, P_2, P_3, P_4$. In each pair of tangents, if we look along tangent $L_i$ in the direction from $P_i$ to the scanned object (i.e., the direction from CT source to detector), then $L_i$ lies on the left side of the scanned object. Therefore, we call each such $L_i$ a left tangent. Similarly, we call each $R_i$ a right tangent.

Figure 6C:
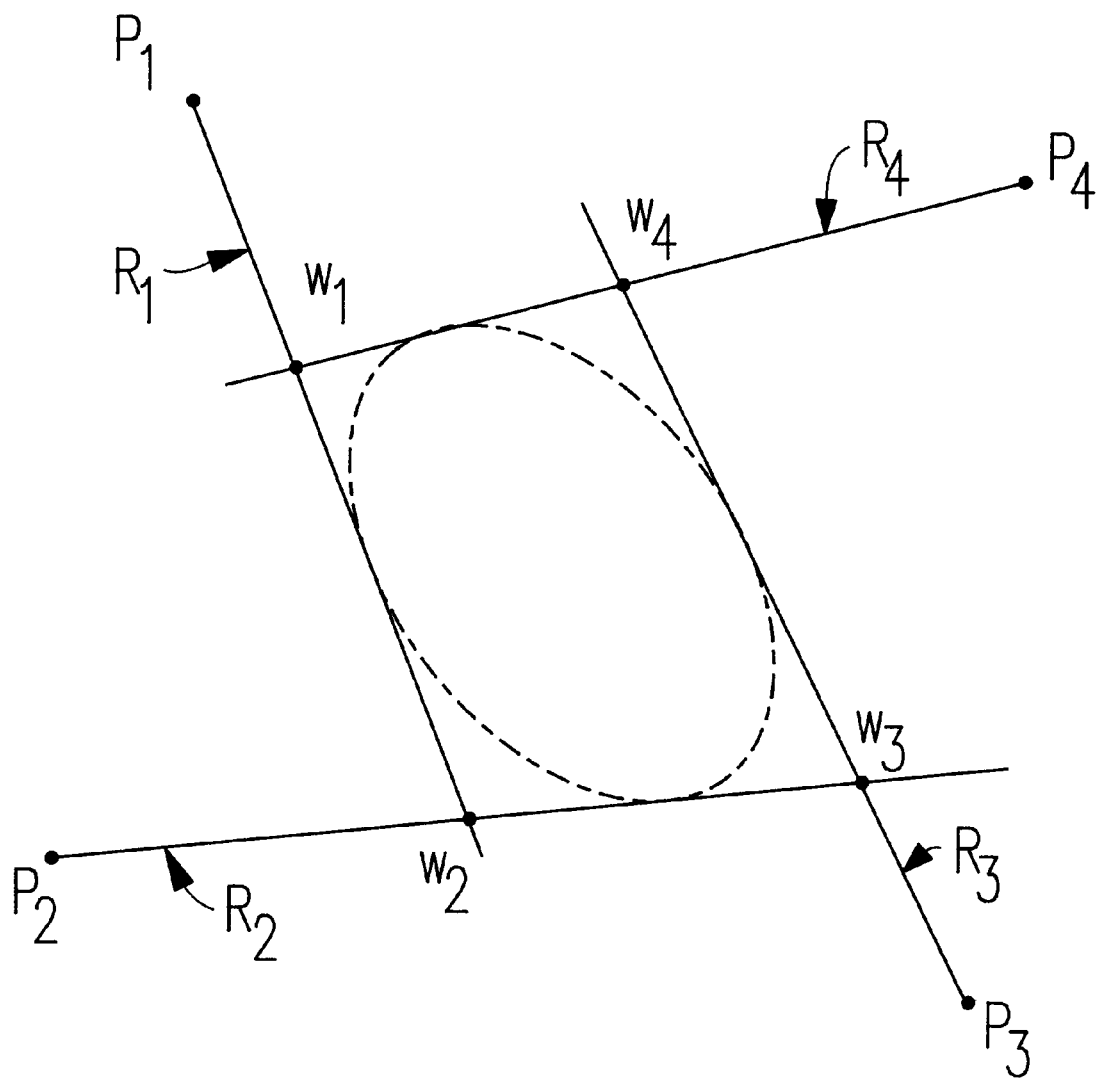
Figure 6D:
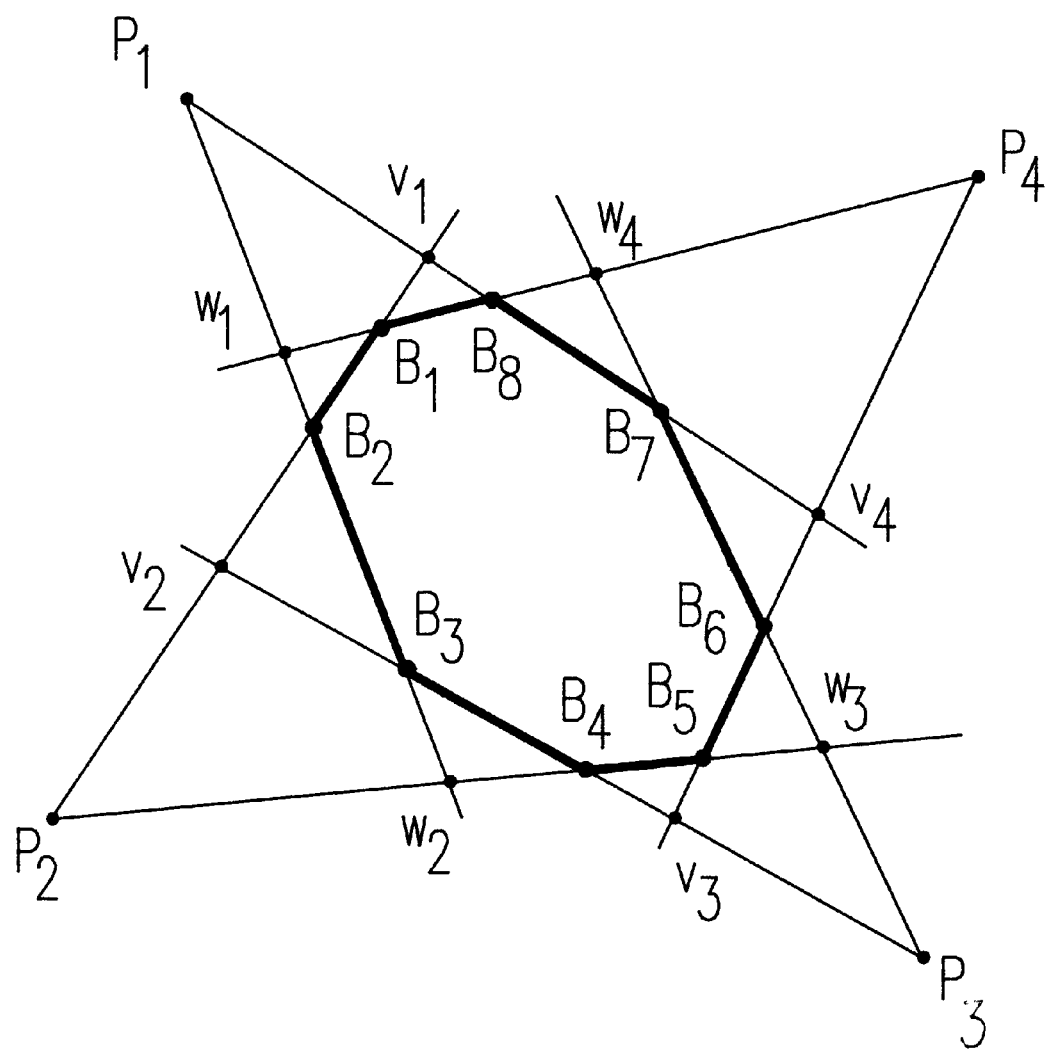

Suppose for the moment that we are dealing with completely noise-free CT data. In this ideal case, both the left and right tangents sets are consistent tangent sets (in the sense that we defined the term consistent previously). Therefore the desired object boundary could be calculated simply as follows:

Compute two convex polygons, a left polygon $P_{left}=(v_1, v_2, v_3, v_4)$ formed by the intersection of the set of left tangents (see FIG. 6B), and a right polygon $P_{right}=(w_1, w_2, w_3, w_4)$ formed by the intersection of the set of right tangents (see FIG. 6C).

The desired object boundary is now computed as the intersection between polygons $P_{left}$ and $P_{right}$, as shown in FIG. 5d, that is, the object boundary is polygon $P_{boundary}=(B_1, B_2, B_3, B_4, B_5, B_6, B_7, B_8)$. (Note that computing the intersection of two polygons can be done using prior art algorithms, for example, J. O'Rourke, *Computational Geometry in C*, Cambridge University Press, 1994).

The problem that we face when dealing with the non-ideal case, is that noise in the data can result in inconsistent sets of left and right tangent sets, that will not uniquely define left and right polygons $P_{left}$ and $P_{right}$. An example of this problem, and the difference between a consistent, and an inconsistent set of tangents is shown respectively in FIGS. 7A and 7B.

Figure 7A:
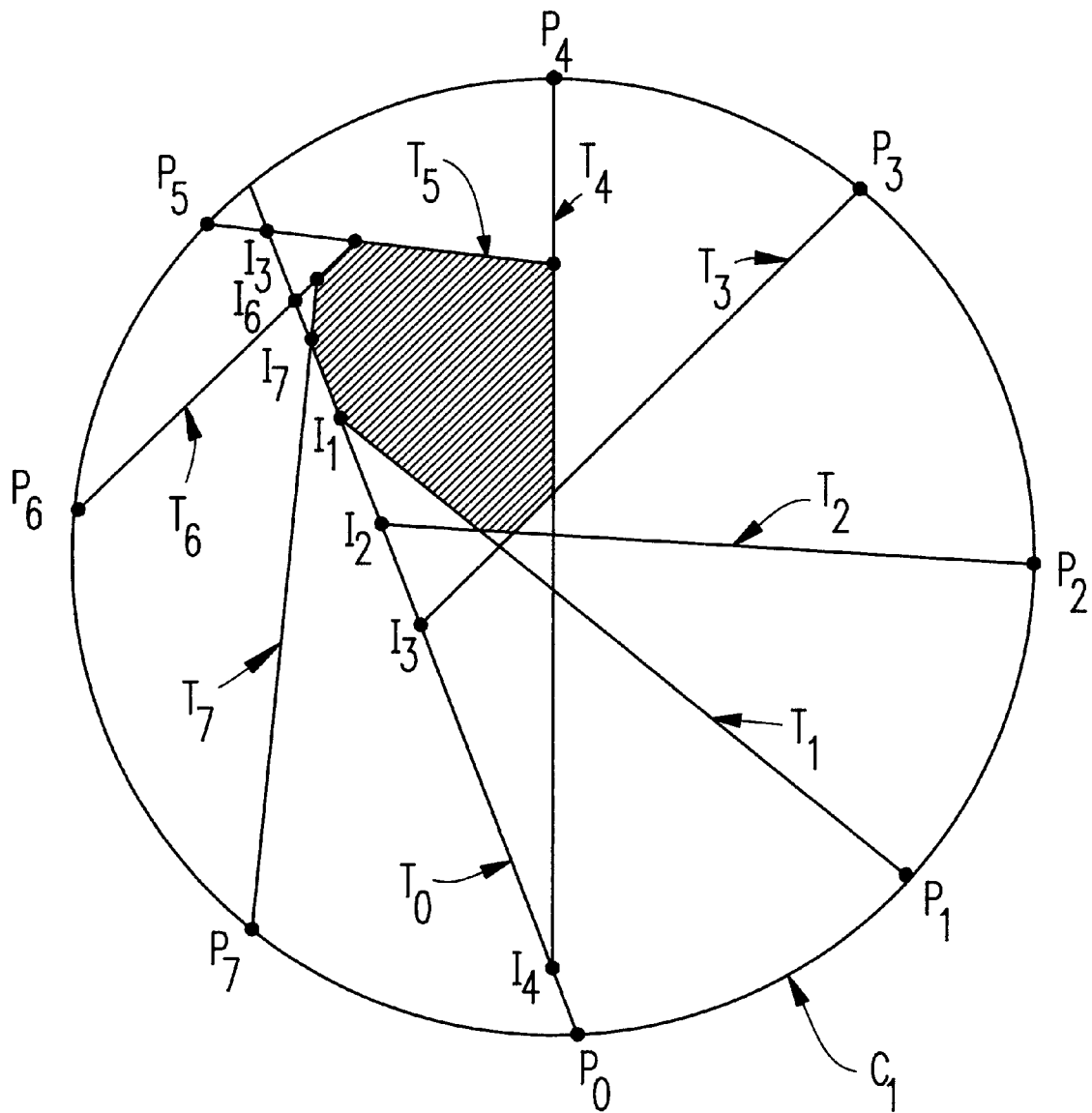
FIGS. 7A and 7B respectively illustrate examples of consistent and inconsistent tangents.

FIG. 7A shows a set of consistent tangents. Here the tangents $T_i$ are those line segments emanating from the (X-ray) source points $P_i$ that lie on circle $C_i$. These $T_i$ are left tangents; that is, when looking from points $P_i$ towards the center of their common circle, all these tangent lines lie on the left of some convex object. This convex object is guaranteed to lie within the shaded polygonal area bounded by these tangents (and this object's boundary can be determined as described previously, and as illustrated in FIGS. 6A to 6D).

We now describe the method used in this invention to determine whether a set of tangents is consistent or not. This is done by examining the pattern of pair-wise intersections between the tangents.

As illustrated in FIG. 7A, we define the following two orderings imposed on the set of tangents $\{T_1, T_2, T_3, T_4, T_5, T_6, T_7\}$:

The Intersection Ordering: This is the ordering imposed by the set of distances between (i) $P_0$, and (ii) the set of intersection points $\{I_5, I_6, I_7, I_1, I_2, I_3, I_4\}$. If we order by decreasing distance, the ordering imposed is $(T_5, T_6, T_7, T_1, T_2, T_3, T_4)$.

The Circle Ordering: This is the counter-clockwise ordering around circle C of $\{T_1, T_2, T_3, T_4, T_5, T_6, T_7\}$. This is a cyclic ordering, and can therefore be expressed in a number of ways, for example, $(T_5, T_6, T_7, T_1, T_2, T_3, T_4)$.

We use these concepts to define the following term. We say that a tangent $T_0$ is consistent with the set of tangents $\{T_1, T_2, \ldots, T_m\}$, if the two orderings of $\{T_1, T_2, \ldots, T_m\}$, as described above, that is the intersection ordering, and the circle ordering, are equal. Note that in the example shown in FIG. 7A, these two orderings of $\{T_1, T_2, T_3, T_4, T_5, T_6, T_7\}$ are in the same, and therefore $T_0$ is consistent with $\{T_1, T_2, T_3, T_4, T_5, T_6, T_7\}$.

Using this definition of consistency between a single tangent and a set of tangents, we define the following. A set of tangents $\{T_j, j=1, \ldots, n\}$ is called a consistent set of tangents, if for each $k=1, \ldots, n$, the tangent $T_k$ is consistent with the rest of the set, i.e., with $\{T_j, j=1, \ldots, (k-1), (k+1), \ldots, n\}$.

Figure 7B:
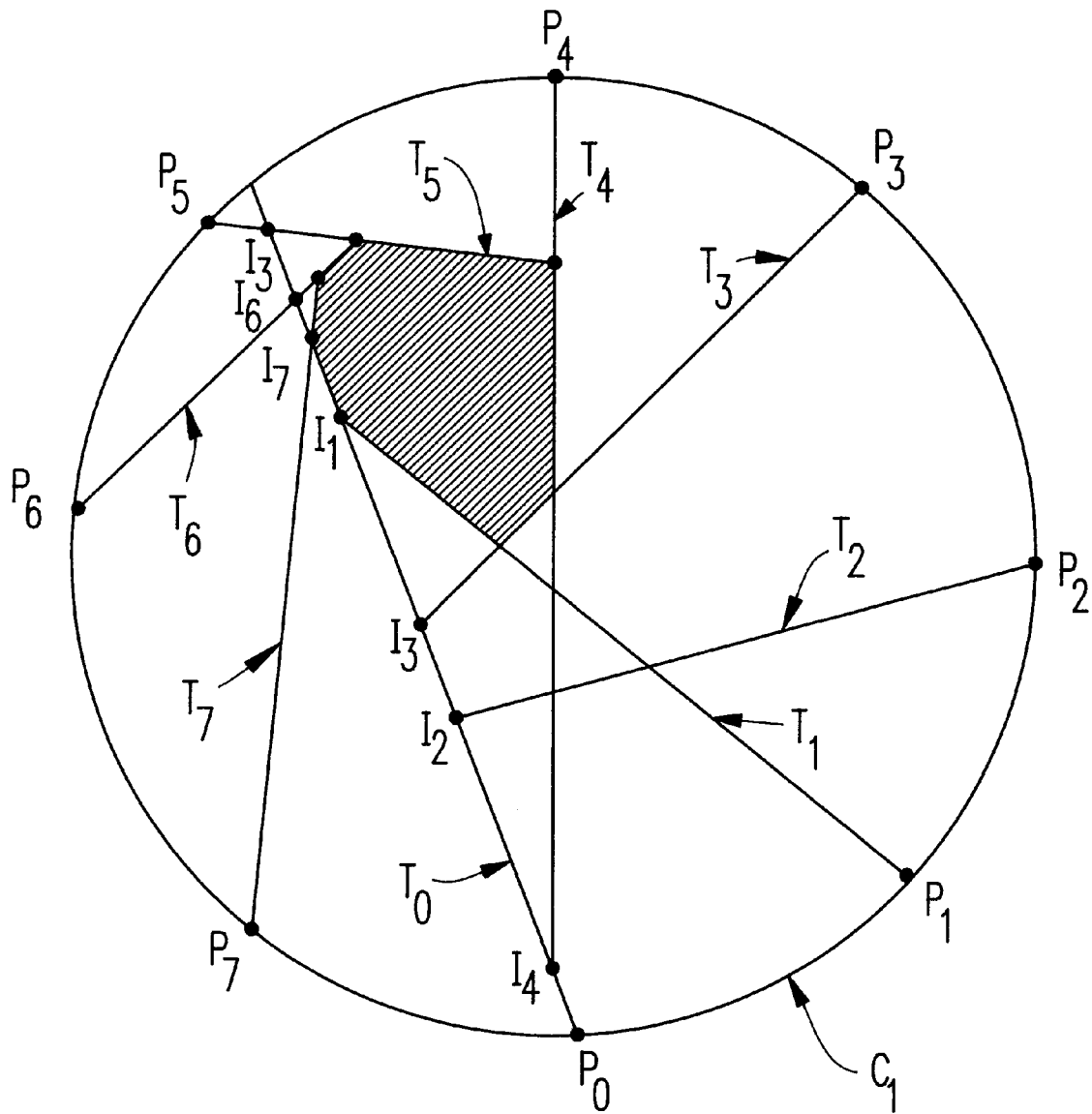

FIG. 7B shows an example where $T_0$ is not consistent with the set of tangents $\{T_1, T_2, T_3, T_4, T_5, T_6, T_7\}$. This is the same example as in FIG. 6A, except that the position of tangent T2 has changed. As a result, $T_0$ is no longer consistent with the tangents $\{T_1, T_2, T_3, T_4, T_5, T_6, T_7\}$. As this example illustrates, an inconsistent set of tangents cannot define the boundary of a convex object (or in fact of a concave object). To see this, ignore tangent $T_2$ for the moment. The remaining of tangents are consistent, and together they bounded the shaded convex region in FIG. 7B. However, adding the constraint imposed by $T_2$ leads to the definition of an impossible object, since this object would be required to both (a) lie within the shaded region, and (b) touch tangent line $T_2$. Eliminating tangent $T_2$ from the set of tangents $\{T_1, T_2, T_3, T_4, T_5, T_6, T_7\}$, results in a subset of consistent tangents. Note that an alternative way to obtain a consistent subset is to eliminate tangent $T_3$ instead.

We call this process of creating a consistent subset of tangents by eliminating one or more tangents from a set of inconsistent tangents, the process of resolving the inconsistent set of tangents. In this invention, we describe two different methods for resolving a set of inconsistent tangents.

In order to describe the first method of resolving an inconsistent set of tangents, we define the following concept. The coherence between a single tangent T0, and set oftangents $\{T_1, T_2, T_3, \ldots, T_m\}$, is defined to be equal to the size of the largest subset of $\{T_1, T_2, T_3, \ldots, T_m\}$ with which $T_0$ is consistent. For example, in FIG. 7B the coherence between $T_0$ and $\{T_1, T_2, T_3, T_4, T_5, T_6, T_7\}$ is 6, since $T_0$ is consistent with $\{T_1, T_3, T_4, T_5, T_6, T_7\}$ (and also, for example, with $\{T_1, T_2, T_4, T_5, T_6, T_7\}$).

The computation of coherence involves finding the longest common subsequence in the intersection ordering and the circle ordering of $\{T_1, T_2, T_3, \ldots, T_m\}$. This can be done by anyone versed in the art of computer algorithms, using know methods, (see, for example, page 319 of the book *Introduction to Algorithms* by Cormen et al., published by McGraw-Hill, 1990).

Thus, coherence is a measure of how close $T_0$ and $\{T_1, T_2, T_3, \ldots, T_m\}$ are to being consistent. Note that when $T_0$ is consistent with $\{T_1, T_2, T_3, \ldots, T_m\}$, their coherence will equal m (the size of set $\{T_1, T_2, T_3, \ldots, T_m\}$).

Figure 8:
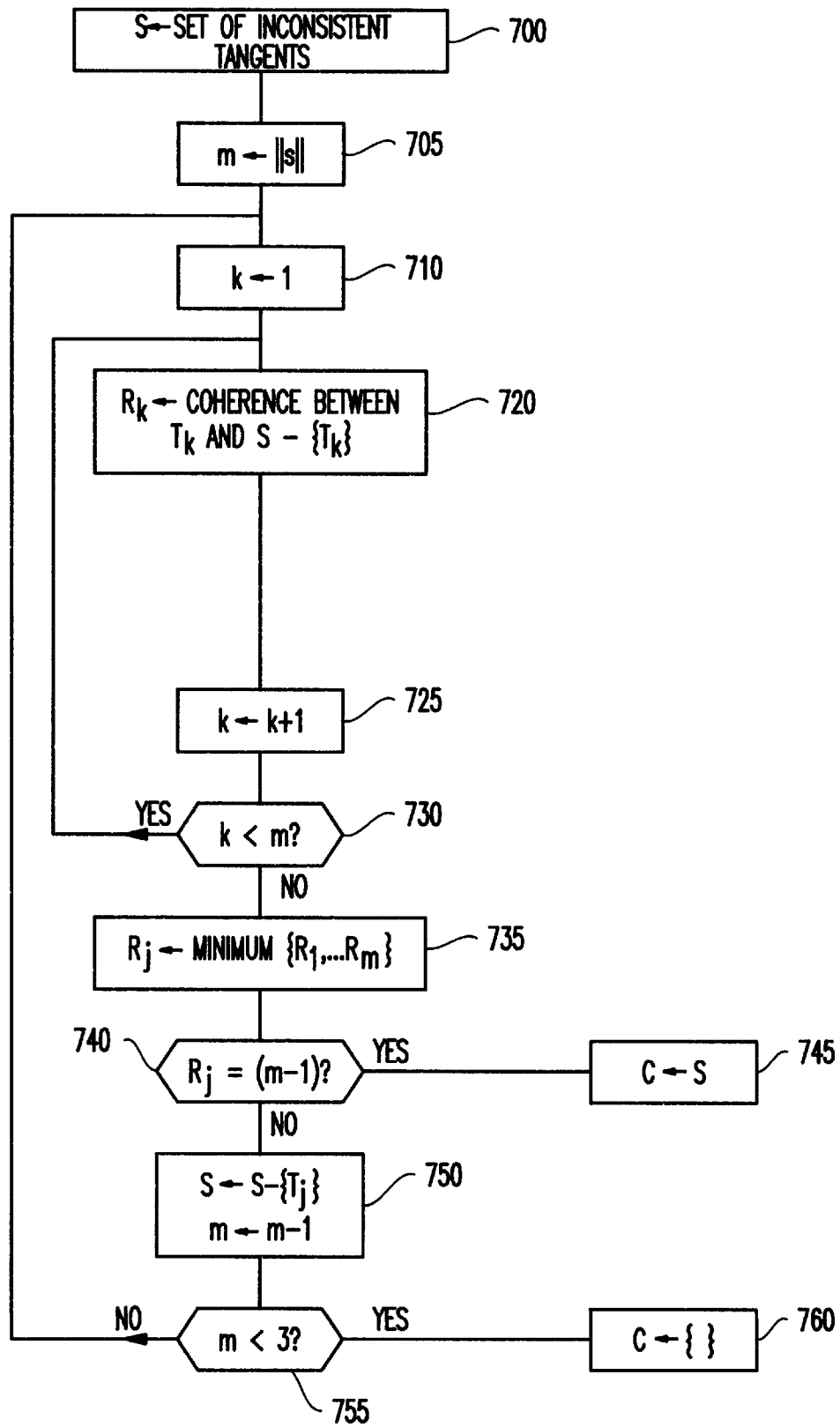
FIG. 8 is a flow chart showing one technique of resolving tangents inconsistencies.

FIG. 8 shows a flow-chart that describes the process of resolving an inconsistent set of tangents S (block 700), to produce a consistent subset C (blocks 745 or 760). In function block 705, m is set to the current size of S. In function block 710, a counter k, that is used to index the elements of S is initialized. In function block 720, $R_k$ is set to the value the coherence between $T_k$ (the $k^{th}$ element in S) and $S-\{T_k\}$. In function block 725, k is incremented by 1. In decision block 730, k is compared with m, and if k is smaller, the process loops back to block 710; otherwise, the process continues with block 735 in which we compute $R_j$, the smallest member of $\{R_1, R_2, R_3, \ldots, R_m\}$). In decision block 740, we test whether $R_j$ is equal to (m−1), and if it is, this means that S has been resolved, and is now consistent, and the process terminates in block 745. If the test in decision block 740 is false, then S is still inconsistent. In function block 750, the tangent with the lowest coherence removed from S, and m is reduced by 1. In decision block 755, we test if m is less than three, and if it not, the process loops back to block 710. On the other hand, if m is less than three, S contains two tangents only, which are not sufficient to define the boundary on an object. We therefore consider S to be un-resolvable, and terminate in block 760, by setting C to be the empty set.

We now describe the second method of resolving an inconsistent set of tangents. To do this, we first define the following concepts. Recall that the coherence between a single tangent $T_0$, and set of tangents $\{T_1, T_2, T_3, \ldots, T_m\}$, is defined as the size of the largest subset of $\{T_1, T_2, T_3, \ldots, T_m\}$ with which $T_0$ is consistent.

Suppose that $\{Y_1, Y_2, \ldots, Y_r\}$ is the largest subset of $\{T_1, T_2, T_3, \ldots, T_m\}$ with which $T_0$ is consistent, and let $\{Z_1, Z_2, \ldots, Z_{(m-r)}\}$ be the complement of this set, i.e., $\{Z_1, Z_2, \ldots, Z_{(m-r)}\} = \{T_1, T_2, T_3, \ldots, T_m\} - \{Y_1, Y_2, \ldots, Y_r\}$. We say that each $Z_i$ is incompatible with $T_0$, and the incompatibility of a tangent is defined to be equal to the total number of other tangents with which it is incompatibility.

Figure 9:
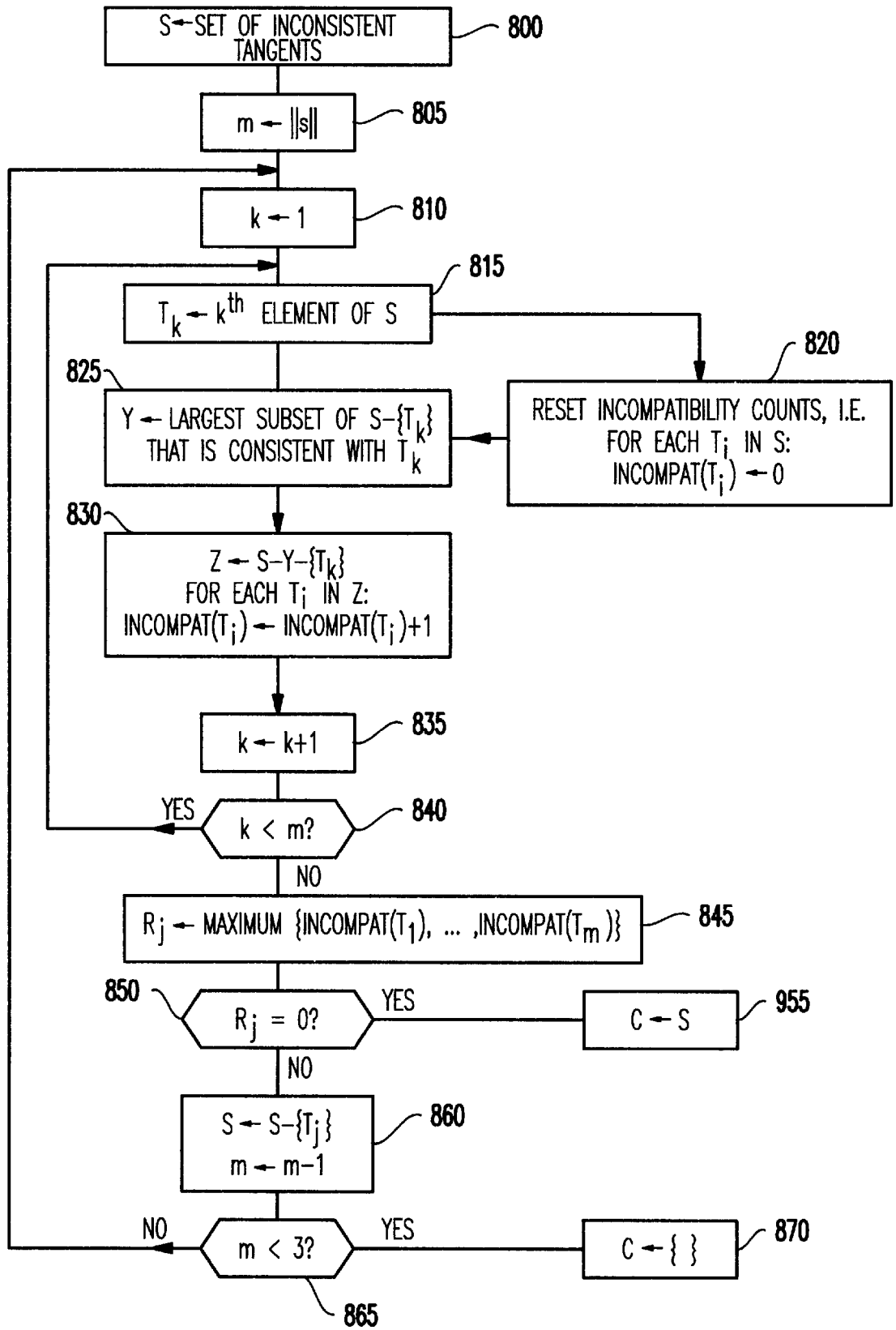
FIG. 9 is a flow chart showing an alternative technique of resolving tangents inconsistencies

FIG. 9 shows a flowchart of the second method for resolving an inconsistent set of tangents. Like the first method described previously, it repeatedly removes a tangent from a set of inconsistent tangents until a consistent subset is obtained. The basic difference between the two methods is that in this second method the we repeatedly remove the tangent with maximum incompatibility (as opposed to minimum coherence).

With reference to FIG. 9, in function block 805, m is set to the current size of S. In function block 810, a counter k, that is used to index the elements of S is initialized. In function block 815, $T_k$ is set to the $k^{th}$ element of S. Then the incompatibility counts are reset in function block 820. Next, in function block 825 Y is set to the largest subset of $S-\{T_k\}$ that is consistent with Tk, and in function block 830, Z is set to $S-Y-\{T_k\}$ for each $T_i$ in Z. In function block 835, k is incremented by 1. In decision block 840, k is compared with m, and if k is smaller, the process loops back to block 810; otherwise, the process continues with block 845 in which we compute $R_j$, the smallest member of $\{R_1, R_2, R_3, \ldots, R_m\}$). In decision block 850, we test whether $R_j$ is equal to (m−1), and if it is, this means that S has been resolved, and is now consistent, and the process terminates in block 855. If the test in decision block 850 is false, then S is still inconsistent. In function block 860, the tangent with the lowest coherence removed from S, and m is reduced by 1. In decision block 865, we test if m is less than three, and if it not, the process loops back to block 810. On the other hand, if m is less than three, S contains two tangents only, which are not sufficient to define the boundary on an object. We therefore consider S to be un-resolvable, and terminate in block 870, by setting C to be the empty set.

As with the computation of coherence, the computation of incompatibility involves finding the longest common subsequence in the intersection ordering and the circle ordering of $\{T_1, T_2, T_3, \ldots, T_m\}$.

It should be noted that these two tangent properties of (a) coherence, and (b) incompatibility, both provide an estimate of the likely positional errors in the tangents. Low coherence and high incompatibility are both used in this invention as a measure of these positional errors, and both methods described in this invention for resolving of a set of inconsistent tangents work by eliminate tangents in the order of estimated error.

Figure 10:
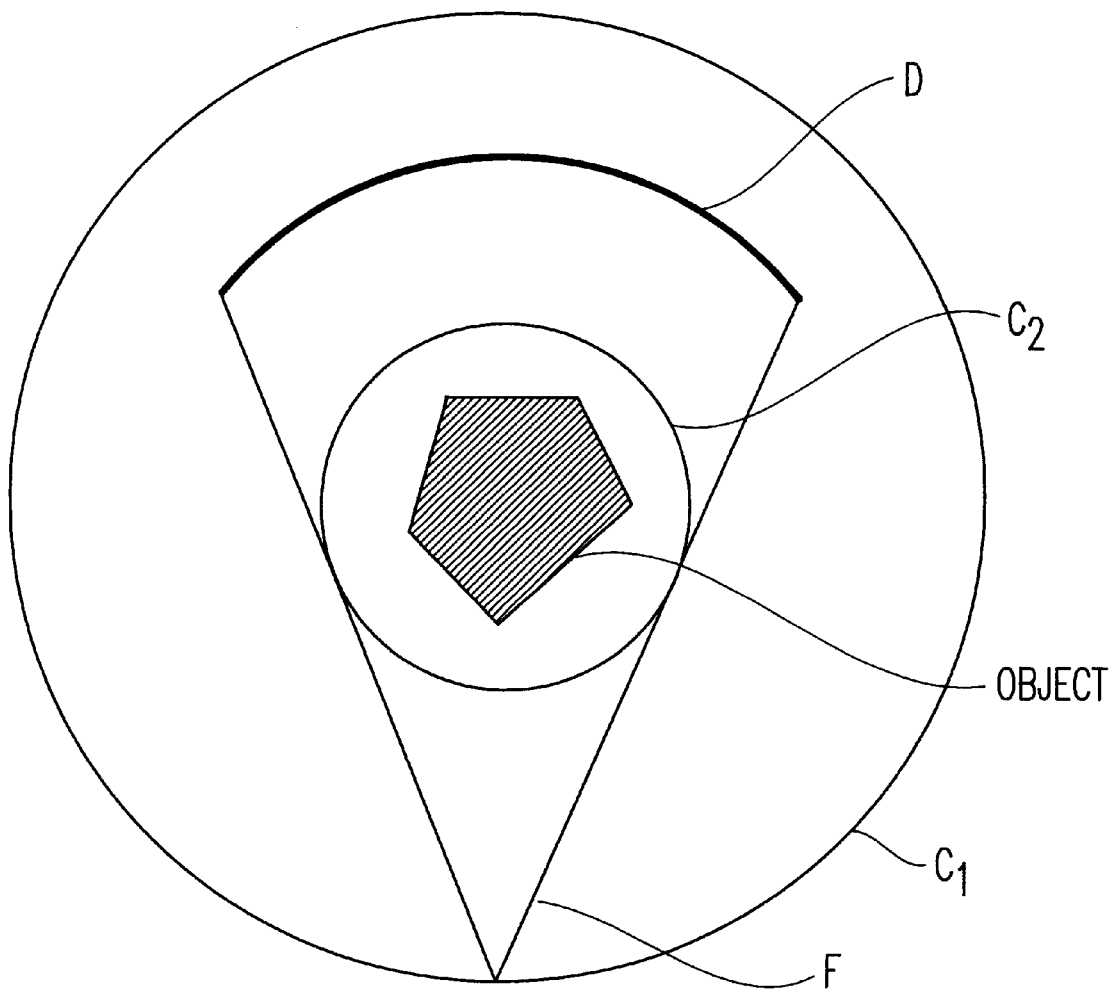
FIG. 10 illustrates the alternative technique.

In the following variation of this second method, we compute approximated incompatibilities to improve computational efficiency. The idea behind this is illustrated in FIG. 10. Here $C_1$ is the circle along which the x-ray source travels, and D is the X-ray detector. Based on this geometry of the X-ray CT system it can easily be seen that any object being scanned must lie with the circle $C_2$, since anything outside $C_2$ does not lie on the path of an X-ray traveling from the X-ray source S to the detector D.

Now given $T_0$, and set of tangents $\{T_1, T_2, T_3, \ldots, T_m\}$, we restrict the finding the longest common subsequence between (a) the intersection ordering, and (b) the circle ordering, by considering only that subset of $\{T_1, T_2, T_3, \ldots, T_m\}$ that intersect $T_0$ and $\{T_1, T_2, T_3, \ldots, T_m\}$ that lie within $C_2$. Since the data we are working with is noisy, this restriction can be relaxed to allow a small tolerance by consider also any intersections that lie a small distance (specified by the tolerance) outside $C_2$. We call the incompatibilities computed with these restricted orderings, approximated compatibilities.

The advantage of working with the approximated compatibilities, is that the total number of intersections between tangents that have to be computed can be greatly reduced as described below and illustrated in FIG. 11. Starting with $T_0$, tangents are visited in an order specified by the circle ordering $(T_1, T_2, \ldots, T_m)$, and their intersection with $T_0$ is determined. A counter is initialized to zero. Each time an intersection falls outside the circle $C_2$, the counter is incremented. Each time the intersection falls inside the circle $C_2$, the counter is reset to zero. Once the counter reaches a pre-defined threshold value (based on the amount of tolerance allowed for noise), no further tangents are visited. The method then visits tangents in an order specified by the reverse circle ordering, i.e., $(T_m, T_{m-1}, \ldots, T_1)$. The counter is initialized to zero, and the process is repeated, i.e., the intersection of each tangent with $T_0$ is determined until the counter again reaches the pre-defined threshold value.

Figure 11:
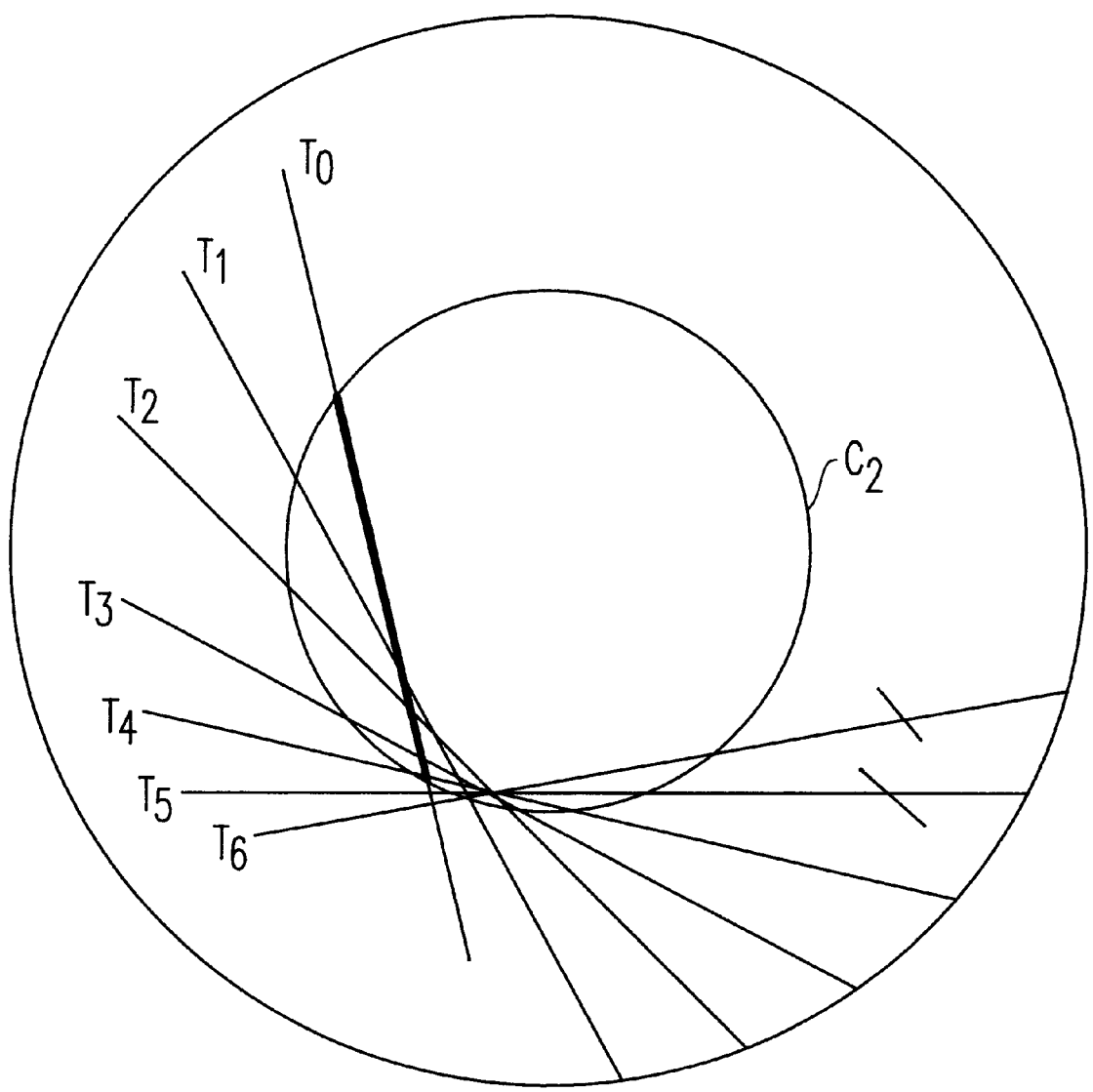
FIG. 11 illustrates the method of increasing the efficiency of the method by limiting the number of line intersection that are computed.

FIG. 11 shows an example of this process, with a threshold value of two. Here the set of intersections between $T_0$ and $\{T_1, T_2, T_3, T_4, T_5, T_6\}$ are computed in order. Then the process stops since two consecutive intersections lying outside $C_2$ have been detected.

Given this disclosure, alternative equivalent embodiments will become apparent to those skilled in the art. These embodiments are also within the contemplation of the invention. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer system for processing computed tomography data comprising:
   a computer with a memory, a central processing unit (CPU), and a display monitor;
   a data structure resident in said memory and containing a tomographic image corrupted by noise;
   a data structure resident in said memory and containing at least a subset of projection data from which the tomographic image has been reconstructed; and
   a process executed by the CPU, to identify boundaries of convex objects within the tomographic image, wherein the boundaries of the convex objects are identified by detecting edges in the projection data, deriving from said edges, line segments in the tomographic image, and deriving from said line segments the boundary of a convex object present in the tomographic image.

2. A computer system for processing computed tomography data comprising:
   a computer with a memory, a central processing unit (CPU), and a display monitor;
   a data structure resident in said memory and containing a tomographic image corrupted by noise;
   a data structure resident in said memory and containing at least a subset of projection data from which the tomographic image has been reconstructed; and
   a process executed by the CPU, to identify boundaries of convex objects within the tomographic image,
   wherein the process executed by the CPU identifies boundaries of convex objects by detecting pairs of edges in the projection image data, deriving from said edge pairs two corresponding sets of the line segments in the tomographic image, said sets of line segments being tangent to a convex object in the tomographic image, then deriving from each of the said two sets of line segments a subset, known as a consistent subset, and finally deriving from said two consistent subsets of line segments the boundary of an convex object present in the tomographic image.

3. A computer-implemented method for processing computed tomography data to identify boundaries of convex objects within a tomographic image comprising the steps of:
   detecting pairs of edges in the projection image data;
   deriving from said edge pairs two corresponding sets of the line segments in the tomographic image, said sets of line segments being tangent to a convex object in the tomographic image;
   deriving from each of the said two sets of line segments a subset, known as a consistent subset; and
   deriving said two consistent subsets of line segments the boundary of an convex object present in the tomographic image.

4. The computer-implemented method as in claim 3, wherein said step of detecting pairs of edges in the projection image data comprises the steps of:
   inputting CT image data and projection data;
   applying an edge detection algorithm to the input projection data;
   using the input CT image data and the input projection data to which the edge detection algorithm has been applied, determining constraints on possible edges for each row in the projection image data; and
   outputting sinogram edge pairs.

5. The computer-implemented method as in claim 4 further comprising the steps of:
   identifying a region enclosing an object of interest in the input CT image data;
   inputting CT scanner geometry; and
   computing limits on locations of the sinogram edges within the identified enclosing region based on the input scanner geometry, the computed limits being used in the step of determining constraints on possible edges.

6. The computer-implemented method as in claim 3, wherein said step of deriving from said edge pairs, two corresponding sets of the line segments in the tomographic image is performed by deriving a corresponding line segment for each said sinogram edge, which is a sinogram pixel, and comprises the steps of:
   identifying a CT ray and view corresponding to said sinogram pixel;
   computing, from the view and the CT scanning geometry, a three-dimensional position, P, of a CT X-ray source at a time said sinogram pixel data was acquired;

computing, from the ray and CT scanning geometry, a three-dimensional position, Q, of a CT X-ray detector cell at the time said sinogram pixel data was acquired; and producing from these two three-dimensional points a line segment (P,Q).

7. The computer-implemented method as in claim 3, wherein said step deriving a consistent subset from a set of line segments of comprises the steps of:

testing to determine if a set of line segments is inconsistent, and if it is, repeating the following two steps until the set becomes consistent;

computing for each line segment an estimate of its positional error; and removing from the set of line segments a line segment with a highest estimated positional error.

8. The computer-implemented method as in claim 7, wherein said estimate of positional error of a line segment is computed to be inversely proportional to a value defined as a coherence of the line segment.

9. A computer-implemented method as in claim 7, wherein said estimate of positional error of a line segment is computed to be directly proportional to a value defined as an incompatibility of the line segment.

10. The computer-implemented method as in claim 3, wherein said tomographic images are X-ray CT images that have been corrupted by image reconstruction noise, and said convex objects are prosthetic metal implants such a those used in total hip replacement surgery.

11. The computer-implemented method as in claim 8, wherein said projection image data are scout data, and is therefore a clinically viable method that can be embodied in a practical, real-world system and be used routinely in hospitals and medical clinics, since it relies only on data that are available from standard medical CT scanners, that is the CT images and scout images (and not the original sinogram data).

12. The computer-implemented method as in claim 3, for finding object boundaries in tomography images by finding edges in sinogram data, thereby providing a segmentation method that is insensitive to the image noise introduced by the process of image reconstruction from projections.

13. The computer-implemented method as in claim 3, wherein said step of deriving the boundary of an convex object from said consistent subsets of line segments comprises the steps of:

computing two convex polygons, the first polygon defined by the intersection of the line segments in the first set of said line segments, and the second polygon defined by the intersection the line segments in the second set of said line segments; and computing an intersection of said two convex polygons to produce a third polygon which represents the shape of the boundary of the said convex object.

* * * * *